R. P. DAVIS.
Baling Press.

No. 228,876. Patented June 15, 1880.

WITNESSES:
Chas. Nian
C. Sedgwick

INVENTOR:
R. P. Davis
BY
Munn & Co
ATTORNEYS.

UNITED STATES PATENT OFFICE.

RUFUS P. DAVIS, OF MONROE, NORTH CAROLINA.

BALING-PRESS.

SPECIFICATION forming part of Letters Patent No. 228,876, dated June 15, 1880.

Application filed November 7, 1879.

*To all whom it may concern:*

Be it known that I, RUFUS PICKENS DAVIS, of Monroe, in the county of Union and State of North Carolina, have invented a new Improvement in Baling-Presses, of which the following is a specification.

Figure 3:
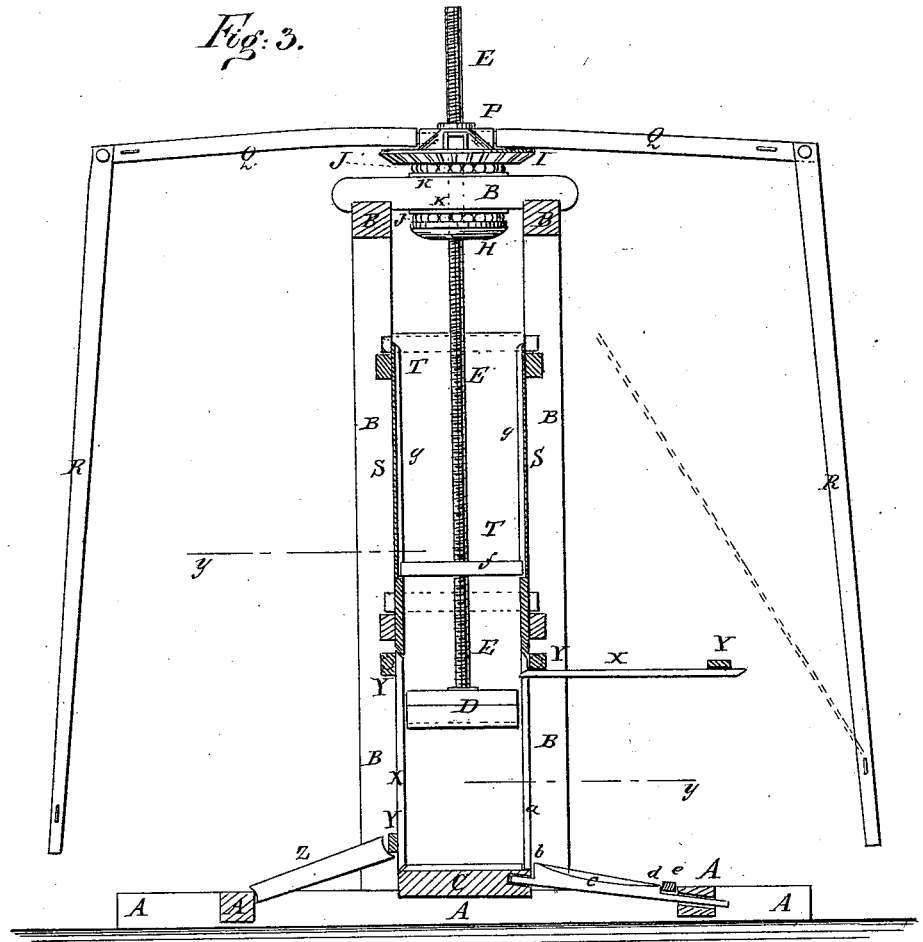
Figure 4:
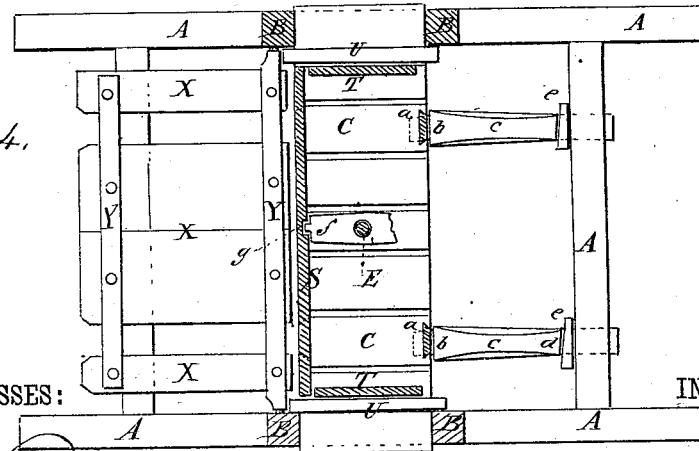
Figure 1:
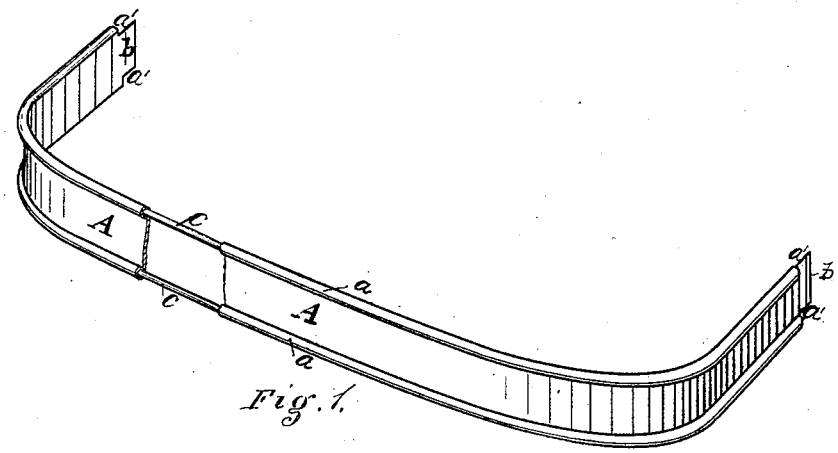
Figure 2:
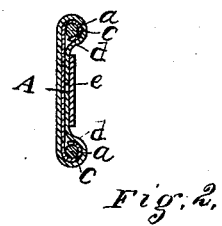

Figure 1, Sheet 1, is a side elevation, partly in section, of my improved press. Fig. 2, Sheet 1, is a plan view. Fig. 3, Sheet 2, is a sectional elevation taken through the line $x$ $x$, Fig. 2. Fig. 4, Sheet 2, is a sectional plan view taken through the line $y$ $y$, Fig. 3.

The object of this invention is to furnish baling-presses so constructed that the followers may be run down quickly while meeting little resistance, but slower and with great power as the bales become more compact, without forcing the bales out of shape.

The invention consists in providing a baling-press with gear-wheels and a crank and a set of levers, so that the follower may be run down rapidly by operating the gear-wheels and with great power by operating the levers, and also in providing the press with devices for supporting the screw when under pressure and for confining the bale while being compressed, as will be hereinafter fully described.

A is the base-frame of the press, which frame is made of such a size as to give a stable support to the press. To the base-frame A is securely attached the upright frame B. To the base-frame A, within the upright frame B, is secured the head-block C, which is grooved upon its upper side in the usual way for the insertion of the bale-bands.

D is the follower, the lower side of which is grooved for the insertion of the bale-bands. To the center of the upper side of the follower D is rigidly attached the lower end of a screw, E. The screw E passes through a long nut, F, which passes through and revolves in a hole in the cross-bar or block G, attached to the top bars of the press-frame B. The nut F has a flange, H, formed upon its lower end to prevent it from moving upward. The nut F is prevented from moving downward by a bevel-gear wheel, I, attached to its upper end. The friction between the flange H, the gear-wheel I, and the cross-bar or block G is lessened by a series of balls, J, interposed between the said flange and gear-wheel, and plates K, attached to the lower and upper sides of the cross-bar or block G. The faces of the plates K and of the adjacent sides of the flange H and gear-wheel I are recessed to prevent the balls J from working out of place. The teeth of the bevel-gear wheel I mesh into the teeth of a bevel-gear wheel, L, attached to the horizontal shaft M. The inner end of the shaft M revolves in bearings in the cross-bar or block G, and its outer part passes through and revolves in bearings in a top bar of the frame B. To the outer end of the shaft M is attached a crank, N.

With this arrangement, by turning the crank N the follower D may be quickly raised and quickly lowered until the resistance of the substance being compressed becomes so great that the follower can be forced down no farther by power applied through the crank N.

The gear-wheel L is held in gear with the gear-wheel I by a notched wedge or key, O, inserted in a dovetailed groove in the inner side of the top bar of the frame B, and which rests against a shoulder or collar of the shaft M. When the gear-wheel L is to be thrown out of gear with the gear-wheel I the key O is withdrawn and the shaft M is drawn outward.

To the upper side of the bevel-gear wheel I is rigidly attached a block, P, which has a hole through its center for the passage of the screw E. In the block P are formed four (more or less) radial sockets to receive the ends of levers Q R. The levers Q R are formed of two parts—an upper horizontal part, Q, and a downwardly-projecting part, R—to the ends of which the power is applied. The levers Q R are connected at their angles by horizontal rods, and the lower end of each preceding lever is connected with the following lever at its angle by inclined rods, which two sets of rods strengthen the levers and distribute the draft strain throughout the entire set.

With this construction, when the substance has been compressed as much as it can be with advantage, by operating the crank N the bevel-gear wheels L I are thrown out of gear, and the compression is completed by power applied to the levers R Q.

The upper part of the frame B is left open

J. F. DAY.
Brow Band for Bridles.

No. 228,877.                    Patented June 15, 1880.

Witnesses.                       Inventor Josiah F. Day
                                 By Attorney George H. Christy